United States Patent [19]
Hernqvist

[11] 3,915,574
[45] Oct. 28, 1975

[54] METHOD FOR DETERMINING AN ACCURATE ALIGNMENT OF A LASER BEAM

[75] Inventor: Karl Gerhard Hernqvist, Princeton, N.J.

[73] Assignee: RCA Corporation, New York, N.Y.

[22] Filed: Sept. 26, 1974

[21] Appl. No.: 509,639

[52] U.S. Cl. .............. 356/138; 356/152; 356/172; 356/9; 250/573
[51] Int. Cl.² .................. G02B 27/24; G02B 27/14
[58] Field of Search .......... 356/138, 141, 152, 172, 356/144, 3, 4, 9, 15, 247; 250/552, 573–575, 250/578

[56] References Cited
UNITED STATES PATENTS
3,437,825 4/1969 Studebaker .................. 356/152
3,857,639 12/1974 Mason ....................... 356/172

Primary Examiner—Vincent P. McGraw
Assistant Examiner—Jon W. Henry
Attorney, Agent, or Firm—Glenn H. Bruestle

[57] ABSTRACT

In the use of laser beams for alignment applications, such as surveying or range finding, the laser beam may be projected for a considerable distance through an ambient medium having a variation in its index of refraction. This will cause the laser beam to deviate from the desired straight line of reference during the surveying operation. The invention utilizes a laser beam having two or more beam components of different frequencies, respectively. If the laser beam deviates from the straight line of reference, the deviation of the beam components will be different and the spacing between the beam components at a distant point can be measured. From this spacing of the beam components, the correct straight line of reference can be determined and fixed relative to the position of one or more of the beam components.

5 Claims, 3 Drawing Figures

METHOD FOR DETERMINING AN ACCURATE ALIGNMENT OF A LASER BEAM

This invention is directed to a method for determining an accurate alignment of a laser beam which is projected through am ambient toward a target to provide a line of reference.

When using a laser beam for alignment over large distances, such as when using a laser transit, the beam may pass through regions of varying pressure and temperature in the atmosphere. Since the index of refraction of air is a function of these parameters, the laser beam may be deflected. If a single color laser beam is used, for instance a He-Ne laser, an unknown error in alignment will occur.

BACKGROUND OF THE INVENTION

The use of a laser beam in pipe laying, surveying, or range finding often requires the accurate determination of a line of reference. Normally, this is the path of the laser beam when projected toward a detecting device. Under normal conditions, the laser beam is considered to be a straight line-of-sight or path and this assumption is quite correct for certain applications. However, if a laser beam is used as a line of reference over large distances, where the ambient air may have a change in its index of refraction due to temperature or pressure variations, the beam may be displaced from the line of reference.

SUMMARY OF THE INVENTION

In accordance with an embodiment of the invention, a laser beam having a plurality of components of different frequencies is projected initially along a path of alignment which is the beam line of reference. Since the ambient through which the beam is projected has a varied or changing index of refraction, the beam components of different frequencies are deflected different amounts by the ambient. At a position along the line of reference, at least two of the components of the laser beam are detected and the separation between the beams at this position is measured. From this measurement, the known indices of refraction of the ambient and the separate frequencies of the two beam components, the respective displacements between the line of reference and the beams can be calculated to determine the correct point of the line of reference at the position where the measurements are made.

DESCRIPTION OF THE PREFERRED EMBODIMENTS

Figure 1:
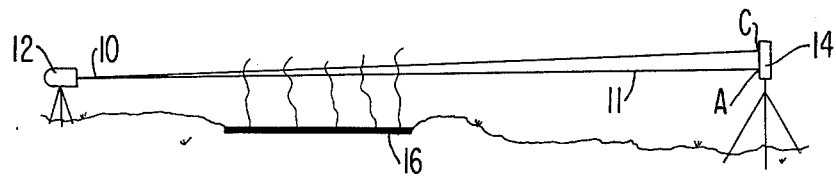
FIG. 1 is a schematic representation of the projection of a laser beam and its detection at a distance.

FIG. 1 discloses a possible situation wherein a laser beam is projected from a laser light source 12 toward a detector 14 spaced at a considerable distance from the source 12. The path of the laser beam 10 is to be used as a line of reference for any appropriate application, such as surveying, range finding or the like. However, if, for example, the laser beam 10 passes over a hot, black-top roadway during part of its travel to the detector 14, the beam 10 will be refracted upwardly by the hotter air over the roadway 16. The reason for this is that the air near the road surface is heated causing a vertical temperature and index of refraction gradient. Then the upper part of the beam travels slower than the lower part causing a bending upward of the beam. The index of refraction of the air varies with temperature and also with height above seal level according to the formula $$n_t - = (n_o - 1) \frac{p/760}{1+\theta t}. \tag{1}$$

where $n_t$ is the index of refraction of the air at $t$ degrees centigrade near the road surface, $n_o$ is the index of refraction of air at temperature 0°C, p is the atmospheric pressure of the ambient where the measurements are made, and $\theta$ is the coefficient of expansion of the air with temperature. The deviation of the laser beam from the straight line of reference 11 is approximately $$\delta \simeq L\alpha \tag{2}$$

where $L$ is the distance from laser projector 12 to the detector 14 and the angle $\alpha$ is the angular deviation from the line of reference 11 of the laser beam 10 and is given by $$n_t = n_o \cos\alpha \tag{3}$$

For small values of angle $\alpha$, $\cos \alpha \simeq 1 - \frac{1}{2} \alpha^2$ or $$\alpha \simeq \sqrt{\frac{2(n_o - n_t)}{n_o}} \tag{4}$$

For small changes in the refractive index, equation (1) can be simplified to $$n_o - n_t \cong \theta t \frac{p}{760}(n_o - 1) \tag{5}$$

or $$\delta = L \sqrt{2\theta t \frac{p}{760}} \sqrt{1 - n_o^{-1}} \tag{6}$$

Figure 2:
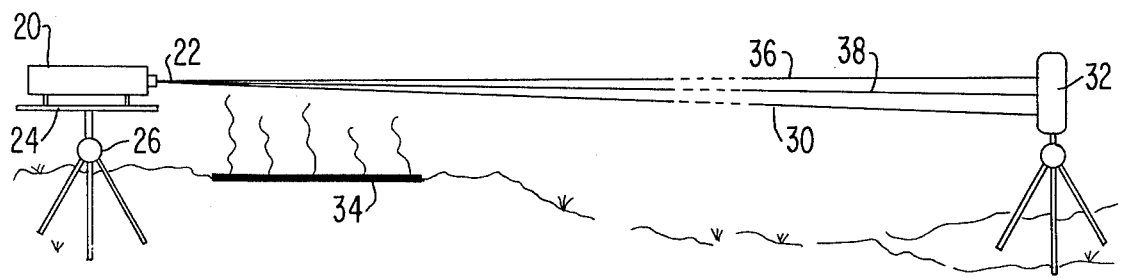
FIG. 2 is a schematic representation of the use of a laser beam and its detection, in accordance with an embodiment of the invention.

In accordance with an embodiment of the invention, there is shown in FIG. 2 a system wherein the deviation of the laser beam can be taken from readily-made measurements and from known data the error of mis-alignment of the laser beam with a line of reference can be determined. It should be noted from equation (6) above that the determination of the deviation of the laser beam from its line or reference depends upon the value of L and $\theta$. The measurement of these values, however, may be very difficult and the measured values may be quite inaccurate due to the circumstances of measurement.

Accordingly then, applicant uses a laser beam having a plurality of components of light of different frequencies. For example, there is shown in FIG. 2 a source of laser light 20 using a krypton laser which emits a laser beam 22 having two components of different wavelengths, namely, a red light component and a blue light component, wherein the red light component has a wavelength of 6471 A and the blue light component has a wavelength of 4762 A. The laser source 20 is supported in a conventional manner on an instrument platform 24 having a universal adjustment device 26 for aligning the laser beam at any angle of elevation from the horizontal and at any angle of azmuth from a reference line. In the particular example shown in FIG. 2, it may be considered that the laser beam 22 is adjusted for horizontal projection along a path or line of reference 30 toward a distance detector 32. However, as the laser beam passes through the ambient to the detector 32, as illustrated, it passes over a heated roadway surface 34. As explained above, the difference in the refractive index of air over the roadway causes the laser beam to deviate from the straight line horizontal path 30. Due to the different frequencies of the components of the laser beam, the two components are deflected or caused to deviate by different amounts. The result is that the laser beam 22, initially directed along the line of reference 30, is now divided into two separate light beams; namely, a beam 36 of blue light and a beam 38 of red light. The blue light beam because of its shorter wavelength is refracted more and at the detector 32 is separated from the red beam 38, as schematically shown in both FIGS. 2 and 3. In the enlarged drawing of FIG. 3, the blue beam 36 is shown as striking the detector 32 at a point B, the red beam 38 is shown as striking the detector 32 at point R, while the line of reference 30 is indicated as intercepting the detector 32 at a point A.

Figure 3:
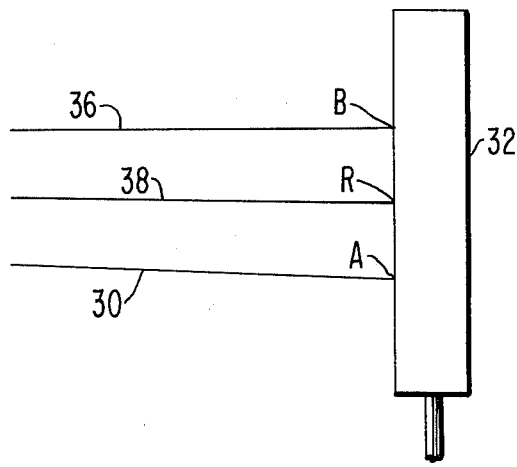
FIG. 3 is an enlarged schematic view of the detector of the laser beam shown in FIG. 2.

The separation of the two beams 36 and 38 at the detector 32 can be measured in any appropriate manner. This distance is represented in FIG. 3 as that between points B and R.

From the equation (6) above, the deviation of the blue beam component 36 from the line of reference 30 becomes $$\delta_B = L \sqrt{2\theta t \frac{p}{760}} \sqrt{1 - n_{oB}^{-1}} \qquad (7)$$

where $n_{oB}$ is the index of refraction of the blue light in air at 0°C. In a similar manner the deviation from the line of reference 30 of the red laser light component is represented by $$\delta_R = L \sqrt{2\theta t \frac{p}{760}} \sqrt{1 - n_{oR}^{-1}} \qquad (8)$$

wherein $n_{oR}$ is the index of refraction in air of the red light at 0°C.

The measured distance $\Delta$ between the blue spot B and the red spot R at the detector is $$\Delta = \delta_B - \delta_R \qquad (9)$$

Equations (7), (8) and (9) give the following equation $$\delta_R = \frac{\Delta}{\sqrt{\frac{1 - n_{oB}^{-1}}{1 - n_{oR}^{-1}}} - 1} \qquad (10)$$

From this equation (10) then, the distance RA at the detector 32 cn be calculated, since the value of $\Delta$ or BR in FIG. 3 is measurable and the values of $n_{oB}$ and $n_{oR}$ are known from tables of reference, such as Table 6c-5 on page 6-110 of the American Institute of Physics Hand Book, 3rd Edition, McGraw Hill, New York, 1972.

Equation (10) thus gives the deviation of the red beam 38 from the line of reference 30. The position of the red beam at detector 32 is accurately indicated and from this position the position A of the line of reference 30 at detector 32 can be determined. This position A, then, is the point at which the line of reference 30 strikes the detector 32 and determines the line of reference at the position of the detector 32.

The detector 32 has been indicated as one with which the position of the light beam components 36 and 38 can be determined. The type of detector is immaterial as long as the light beam components 36 and 38 can be accurately detected and the distance between their separation points B and R can be accurately measured.

That is, if the distance between the laser source 20 and detector 32 is not too great, the light beam components 36 and 38 can be visually detected at the position 32 by the use of a type of screen on which the beams will impinge as a blue spot and a red spot respectively. The screen can be calibrated beforehand, so that the distance between the centers of the two spots can be accurately measured from the screen directly. If there is difficulty in visually detecting the two beam components at the positions of the detector 32, a more sensitive instrument can be used such as a photo-responsive instrument or photodetector, which is appropriately mounted in the path of the two beams with a small opening for receiving a part of one of the beam components only. Such a detector can be positioned to receive the red beam component and adjusted until the red light provides a maximum output signal from the photodetector. The instrument then is moved until the blue beam component is received by the photodetector and to a position at which the blue beam provides a maximum output signal. The distance that the photodetector is moved between the points at which the maximum output signals are recorded can be readidly measured to provide accurately the distance between the beam spots B and R. Other appropriate detector instruments may be used wherein the separation of the two beams at the detector can be accurately measured.

The laser source 20 may be of any appropriate type consisting of a laser device providing a plurality of light components of different frequencies. The krypton laser has been mentioned above, but other lasers also provide two or more light components such as the selenium or the cadmium laser.

It can be readily seen that the separation of the beam components at a distant target or detector merely confirms the fact that the laser beam has been divided into its components and the components have been separated by the passage of the laser light through portions of the ambient wherein the index of refraction changes. If there is no separation, however, at the detector, it can be assumed that the ambient through which the laser beam has passed either has a uniform index of refraction or that the deviation of the beam components from the line of reference has been of a nature such that the deviation in one direction has been compensated by a deviation in an opposite direction so as to bring the components together again at the detector. The latter condition would be possible if at one region along the beam path the ambient was hotter than the normal or an average ambient temperature, as described above with regard to the roadway 34, and at another region the ambient was cooler than the average ambient temperature, as if the laser beam were passed across a snow field which would cause an opposite effect on the passage of the beam components as was caused when the beam passed over the hot roadway.

The example given above has described the passage of the laser beam through ana air ambient. However, applicant's invention also is applicable to the use of a laser beam in other ambients, such as water where the temperature of the water may vary between the beam projector and the beam detector.

Again, the laser beam would be refracted due to the change in the refractive index of the water along the path the beam takes through the water. The deviation of the beam components can be calculated in the manner described above knowing the refractive index of the particular ambient at 0°C. temperature.

In the specific example described above the position of the line of reference is fixed from the point that the red beam strikes the detector 32, as schematically shown in FIGS. 2 and 3. That is, the distance RA is determined by the relationship of equation (10), above. This is not limiting, as the line of reference 30 can also be fixed from the position of the blue beam in a similar manner, in which the distance BA is determined by calculating the deviation of the blue beam from the line of reference by the corresponding relationship, $$\delta_B = \frac{\Delta}{\sqrt{\frac{1-n_{oR}^{-1}}{1-n_{oB}^{-1}}}-1} \qquad (11)$$

I claim:

1. A method for determining an accurate alignment of a laser beam, said method comprising initially projecting a laser beam of coherent light having a plurality of components of different frequencies along a path of alignment through an ambient medium having a varied index of refraction, at a position along said path of alignment detecting the components of the laser beam, and at said position measuring the separation of said beam components.

2. The method in accordance with claim 1, wherein said laser beam has at least two beam components, at said position determining the distance $\delta$ of said path of alignment from the path of one of said beam components from said separation of said two beam components at said position and the indices of refraction respectively of said two beam components in said ambient medium at 0°C.

3. The method in accordance with claim 2, wherein said $\delta$ is determined by the relationship.

$$\delta = \frac{\Delta}{\sqrt{\frac{1-n_{oR}^{-1}}{1-n_{oB}^{-1}}}-1}$$

where $\Delta$ is the separation of said two beam components and $n_1$ and $n_2$ are the indices of refraction at 0°C respectively of said one beam and the other of said two beam components.

4. The method in accordance with claim 3, wherein said one beam component is of lower frequency than said other beam component.

5. The method in accordance with claim 4, wherein said laser beam is generated by a krypton laser and said beam components are of red and blue light respectively.

* * * * *

UNITED STATES PATENT OFFICE
CERTIFICATE OF CORRECTION

PATENT NO. : 3,915,574
DATED : October 28, 1975
INVENTOR(S) : Karl Gerhard Hernqvist It is certified that error appears in the above-identified patent and that said Letters Patent are hereby corrected as shown below:

Column 2 line 14 equation (1) should be:

$$n_t - 1 = (n_o - 1) \frac{p/760}{1 + \theta t}$$

Signed and Sealed this eighteenth Day of May 1976

[SEAL]

Attest:

RUTH C. MASON
*Attesting Officer*

C. MARSHALL DANN
*Commissioner of Patents and Trademarks*